Patented Mar. 7, 1944

2,343,643

UNITED STATES PATENT OFFICE 2,343,643

FERROUS ALLOY

Arthur T. Cape, Santa Cruz, Calif., and Charles V. Foerster, Canton, Ohio, assignors to Coast Metals, Inc., Canton, Ohio No Drawing. Application July 16, 1942, Serial No. 451,204

9 Claims. (Cl. 75—128)

This invention relates generally to ferrous alloys, but has reference more particularly to an alloy which is partially adapted for use in the form of weld rods for forming welds between plates or armor.

It has heretofore been customary to weld plates of armor together by means of stainless steels of the 18-8 or 25-20 type, which usually contain less than .10 carbon. Such alloys, while generally satisfactory, are, in view of war conditions, becoming increasingly difficult to obtain in desired quantities, on account of the relatively large amounts of strategically important metals, such as chromium and nickel, which they contain.

We have found, however, that plates of armor can be satisfactorily welded by means of an alloy containing relatively small amounts of chromium and nickel, and that the welds or weld deposits formed by these alloys have certain highly desirable characteristics and properties among which may be mentioned substantially complete austenicity, relatively low hardness which is fairly uniform throughout the weld metal, extreme toughness, and the fact that when a fracture occurs between adjacent plates, the break occurs in the weld metal itself and not in the fusion zone, i. e., the transition zone at the junction between the weld metal and the base metal.

The weld rod is preferably made from a ferrous alloy comprising about .50% to about 1.50 carbon, about 3% to about 12% chromium and about 3% to about 12% nickel, manganese being added, if desired, in amounts up to about 2%, where extreme toughness is desired in the weld deposit, the balance of the alloy being substantially all iron. An alloy within this range which has been found particularly useful is one containing about 1% carbon, about 6% chromium and about 5% nickel.

It is not essential that the weld rod be of the above composition, as long as the weld or weld deposit is of such composition.

When the weld or weld deposit is of the foregoing composition, it is characterized by the fact that it is substantially completely austenitic, the hardness distribution is extremely low, no hard spots being formed anywhere in the weld metal or in the fusion zone. The hardness in general may be as high as 40 Rockwell C, but is preferably less than 30 Rockwell C. The weld deposit is inherently tough, but its toughness may be augmented by the presence of manganese in amounts up to about 2%. Another important characteristic is the fact that fractures between adjacent plates are usually found in the weld deposit itself, rather than in the fusion or transition zone between the weld metal and base metal.

The weld metal is relatively easy to apply or deposit, having good flow characteristics.

We claim:
1. A weld rod for welding together plates of armor, said rod consisting of a ferrous alloy containing carbon in amounts of from about .50% to about 1.50%, and chromium and nickel in amounts of from about 3% to about 12% of each.

2. A weld rod for welding together plates of armor, said rod consisting of a ferrous alloy containing carbon in amounts of from about .50% to about 1.50%, chromium and nickel in amounts of from about 3% to about 12% of each, and manganese in effective amounts up to about 2%.

3. A weld rod for welding together plates of armor, said rod consisting of a ferrous alloy containing about 1% carbon, about 6% chromium and about 5% nickel.

4. A weld deposit comprising a ferrous alloy consisting of carbon in amounts from about .50% to about 1.50%, and chromium and nickel in amounts of from about 3% to about 12% of each.

5. A weld deposit comprising a ferrous alloy consisting of carbon in amounts of from about .50% to about 1.50%, chromium and nickel in amounts of from about 3% to about 12% of each, and manganese in effective amounts up to about 2%.

6. A weld deposit comprising a ferrous alloy consisting of about 1% carbon, about 6% chromium and about 5% nickel.

7. A weld deposit comprising a ferrous alloy consisting of carbon in amounts of from about .50% to about 1.50%, and chromium and nickel in amounts of from about 3% to about 12% of each, said deposit being substantially austenitic, and of fairly uniform hardness not exceeding 40 Rockwell C.

8. A weld deposit comprising a ferrous alloy consisting of carbon in amounts of from .50% to about 1.50%, chromium and nickel in amounts of from about 3% to about 12%, and manganese in effective amounts up to about 2%, said deposit being substantially austenitic, extremely tough, and of fairly uniform hardness not exceeding 40 Rockwell C.

9. The combination of spaced plates of armor, and a weld deposit joining said plates, said deposit consisting of a ferrous alloy containing carbon in amounts of from about .50% to about 1.50%, and chromium and nickel in amounts of from about 3% to about 12% of each, said deposit being substantially austenitic, of fairly uniform hardness not exceeding 40 Rockwell C and being further characterized by the fact that when a fracture occurs between the plates, the break will occur in the weld deposit itself and not in the fusion or transition zone between the weld deposit and the plates.

ARTHUR T. CAPE.
CHARLES V. FOERSTER.